Nov. 18, 1941.    E. W. RUGELEY ET AL    2,262,861
COMPOSITE ARTICLE
Filed May 16, 1939
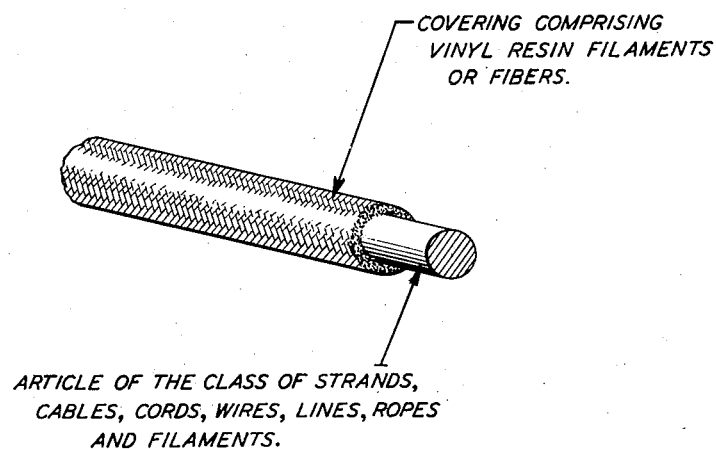
COVERING COMPRISING
VINYL RESIN FILAMENTS
OR FIBERS.
ARTICLE OF THE CLASS OF STRANDS,
CABLES, CORDS, WIRES, LINES, ROPES
AND FILAMENTS.
INVENTORS
EDWARD W. RUGELEY
THEOPHILUS A. FEILD. JR.
JOHN F. CONLON
BY
ATTORNEY Patented Nov. 18, 1941

2,262,861

UNITED STATES PATENT OFFICE 2,262,861

COMPOSITE ARTICLE

Edward W. Rugeley, Theophilus A. Feild, Jr., and John F. Conlon, Charleston, W. Va., assignors to Carbide and Carbon Chemicals Corporation, a corporation of New York Application May 16, 1939, Serial No. 273,892

12 Claims. (Cl. 57—144)

This invention relates to composite articles, and it is directed particularly to strands, filaments, wire, cords, ropes, lines, and the like, which have sheaths or coverings comprising yarn formed from certain vinyl resins.

In the manufacture of many kinds of strands or lines, such as wire, cables of various types, cords, ropes, and the like, it is desirable to provide a covering for the article for purposes of electrical insulation, protection against wear, decoration, or for other reasons. Where the articles need not be sealed from the atmosphere and where good flexibility of the strands, conduits or lines is desired, sheaths or coverings which are of a filamentary nature have been used, the covering consisting of bundles of fibers, woven, wrapped, braided, plaited or otherwise fashioned around the articles to provide the protection or appearance desired.

This invention provides composite articles of the class described having filamentary coverings which give to the articles certain advantages and wearing qualities not otherwise found. Also, the invention provides for the articles coverings of a filamentary or fibrous nature which are non-inflammable, have true elasticity, water resistance, high wet strength, together with resistance to attack by chemical influences or microorganisms. The fibers from which these coverings are made have, in addition, high dielectric strength so that they may be used satisfactorily for electrical insulation. Due to the thermoplasticity of these fibers, coverings made from them may be conveniently sealed against running, fraying or unraveling by fusion of the ends thereof at the time of cutting the articles.

The essence of the invention lies in forming around the articles described a covering comprising yarn made from water-insoluble vinyl resins of relatively high macromolecular weight, preferably not below about 7500, and where the coverings must have strength, the macromolecular weight of the resin should be at least about 15,000. Macromolecular weights referred to herein are those calculated by means of Staudinger's formula from viscosity determinations of solutions (or dispersions) of the resins. Especially desirable are those resins which may result from the conjoint polymerization of vinyl halides with vinyl esters of aliphatic acids, and preferably containing between about 70% and about 95% by weight of vinyl halide in the polymer. Those resins which are made by the conjoint polymerization of vinyl chloride with vinyl acetate, and contain between about 70% and about 95% by weight of vinyl chloride in the polymer, produce the strongest fibers.

The accompanying drawing diagrammatically illustrates composite material in accordance with this invention.

Filaments sufficiently fine for use in forming the coverings described may be made from the vinyl resins by extruding the resin through small orifices, and collecting the threads thus formed. The resin must, of course, be in a plastic state in order to effect the extrusion, or spinning, of the resin into threads. The most practical method of achieving this is to disperse (or dissolve) the resin in a volatile solvent. In the case of the described resins made by the conjoint polymerization of vinyl halides with vinyl esters of aliphatic acids, the resin may be dispersed in warm, dry acetone, or in other liquids from which filaments may be formed in the spinning operation. By "dry" acetone is meant this substance which contains less than about 0.60% by weight of water. It has been found that when the acetone used contains water in excess of this amount, the quality of the resin dispersion is materially impaired, and solutions made from such solvents can be filtered and spun only with great difficulty. The concentration of the vinyl resin in the spinning solution is dependent on and varies inversely with the macromolecular weight of the resin, but the resin content ordinarily employed, using acetone as the solvent, is 30% or less by weight. The resulting "dope" is a clear, heavily gelatinous, non-flowing, plastic mass at room temperature, while at a temperature of 50° C. it assumes a very viscous, slowly flowable state. In the practice of this invention, the spinning, or filament extrusion, operation may be carried out in equipment customarily employed for so-called "dry-spinning" of other types of filaments.

Unless special treatment is applied, it is necessary in most cases to permit the freshly extruded filaments to age for at least twelve hours before the twisting and doubling operations are performed, but aging of the filaments can be advantageously accelerated or replaced by a more brief treatment with heated water. For example, if the filaments are immersed in water at 65° C. for a period of two to five hours, no further aging is required.

The next step in the yarn processing is that of stretching. The importance of this step is more or less in direct proportion to the strength desired in the fibers. In cases where it is desirable to shrink the sheaths or coverings on the articles, the stretching of the filaments is of paramount importance, for it is by heating the finished covering, preferably after it is in place on the article, to about the softening point of the resin, that the stresses developed in the stretching operation are released and the shrinkage is obtained. On the other hand, the unstretched fibers provide a more practicable covering for some purposes, such as in cases where the fibers are to be at least partially fused to each other or to the material which they cover. For example, in some types of electrical insulation it may be desirable to fuse the fibers together, either partially or completely, after they have been formed into a covering on the wire, and for this purpose the stretched fibers may be less desirable than the unstretched ones because coverings made of the former must not be fashioned tightly around the wire, or else the shrinkage which accompanies heating of these filaments will also tend to cause breakage of the fibers. In addition, the unstretched fibers are slightly cheaper, since one less operation need be performed in their manufacture.

If it is desirable to stretch the yarn, the amount of stretch imparted to the yarn may vary considerably up to about 400%, and in normal procedure a stretch of about 75% to 180% may be applied. The extent of the stretch used is determined by the polymer size (average macromolecular weight) of the resin, and by the characteristics desired in the finished fabric. It is important to conduct this operation while the yarn is adequately surface-wetted, and this may be done by immersing the spools from which the yarn is to be stretched in water which may contain a wetting agent or surface tension depressant, such as a sodium salt of a higher alkyl sulfate, or another of the materials commonly used for this purpose in textile operations. It may be desirable to apply the stretch in two or more stages. Thus, the yarn may be initially stretched, say 90%, and in two subsequent operations given additional stretching to the extent of 10% or 20% in each stage.

For a period after the yarn has been stretched, it shows a marked tendency to contract. This characteristic may be readily controlled and modified by a "setting" treatment, for example, by prolonged aging of the yarn under tension, or by subjecting the yarn under tension to moderately elevated temperatures, which greatly accelerate the rate of setting. After this setting treatment the continuous filament yarn may be fashioned into the covering for the strands or lines described, or it may be incorporated directly with other textiles or stapled and carded with or without other fibers, prior to forming the coverings for the articles described. In particular, yarn spun from the stapled vinyl resin fibers described may be fashioned into excellent coverings for rubber filaments, as the coverings so made are more resistant to the wear encountered in the extreme stretching of the rubber filaments during use.

The process of producing yarn from the conjoint polymers of a vinyl halide and a vinyl ester of an aliphatic acid, which is suitable for use in this invention, is disclosed in United States Patent No. 2,161,766 issued June 6, 1939, in the names of E. W. Rugeley, T. A. Fei'd, Jr., and J. F. Conlon, with which this application contains material in common.

The coverings made in accordance with this invention may be used in many ways. For example, electrical wire may be insulated by winding, braiding, weaving, or otherwise covering the wire with yarn made from the vinyl resins described. If desired, other natural and artificial fibers, such as cotton or silk, and the like, may be combined with the vinyl resin fibers to produce a composite yarn. With respect to the insulation of electrical wire, the vinyl resin fibers may be interwoven, braided, or otherwise combined with glass fibers to produce a flexible and very durable insulation of unusually high dielectric strength and fire resistance. Also, it may be advantageous to provide the wire with a covering made with alternate layers of vinyl resin fibers and cotton or silk. Particularly is it desirable to provide a layer of asbestos next to the wire and held in place by the covering comprising the vinyl resin yarn where the wire may become fairly hot in use. In some cases very satisfactory insulation may be provided by first fashioning a covering of the vinyl resin yarn around strands of asbestos fibers and then forming around the wire a covering from the composite asbestos thread. The vinyl resin yarn may be wound around or otherwise fashioned to cover threads of other textile fibers to produce cords and, in this respect, the fibers described are particularly suitable for covering or binding together elastic filaments, such as those of rubber, to form strands which may be used in clothing where extreme extensibility and elasticity are desired.

An outstanding advantage of the coverings made in accordance with this invention is that after being formed around the strands, lines, wire, or other articles, the coverings may be made to fit the article and conform to its shape very closely by heating the covering to a temperature not exceeding the softening point of the resin. By this means the vinyl resin fibers may be made to shrink as much as 30% or 40% without altering the individuality of the fibers, thus providing a means for controlling the porosity of the covering as well as the fidelity with which it conforms to the article it surrounds.

Although the invention has been described specifically with reference to the preparation of coverings from filaments of the vinyl resins which may result from the conjoint polymerization of vinyl halides with vinyl esters of aliphatic acids, the invention is applicable to the preparation of coverings from filaments made from any vinyl resins which are water-insoluble and of sufficiently high macromolecular weight to permit spinning into textile filaments. As examples of other suitable resins there may be mentioned the polyvinyl acetal types, particularly the polyvinyl partial acetal resins which are water-insoluble and contain unreacted polyvinyl hydroxyl groups and acetal linkages with aliphatic aldehyde having from two to six carbon atoms in the molecule.

Many special uses and adaptations of the materials of this invention will be apparent to those skilled in the art. The procedures by which the new coverings are formed can be varied in many of their details, and such modifications are included within the invention as defined by the appended claims.

We claim:
1. Composite material comprising in combination, an article of the class of strands, cables, ropes, cords, wires, lines and filaments; and a covering composed of filaments or fibers of a vinyl resin substantially identical with a resin resulting from the conjoint polymerization of a vinyl halide with vinyl ester of an aliphatic acid, said resin having an average macromolecular weight of at least 7500.

2. Composite material comprising in combination, an article of the class of strands, cables, ropes, cords, wires, lines and filaments; and a covering composed of textile fibers of a vinyl resin substantially identical with a resin resulting from the conjoint polymerization of a vinyl halide and a vinyl ester of an aliphatic acid, which contains from about 70% to about 95% by weight of the halide in the polymer and which has an average macromolecular weight of 15,000.

3. Composite material comprising in combination, an article of the class of strands, cables, ropes, cords, wires, lines and filaments; and a shrunk covering composed of textile fibers of a vinyl resin substantially identical with a resin resulting from the conjoint polymerization of a vinyl halide and a vinyl ester of an aliphatic acid, which contains from about 70% to about 95% by weight of the halide in the polymer and which has an average macromolecular weight of 15,000.

4. Composite articles comprising wire with an insulating covering, said covering comprising filaments or fibers of a vinyl resin substantially identical with a resin resulting from the conjoint polymerization of a vinyl halide with a vinyl ester of an aliphatic acid, which contains from about 70% to about 95% by weight of the halide in the polymer and which has an average macromolecular weight of at least 7500.

5. Composite material comprising wire and a shrunk covering, said covering comprising textile fibers of a vinyl resin substantially identical with a resin resulting from the conjoint polymerization of a vinyl halide and a vinyl ester of an aliphatic acid, which contains from about 70% to about 95% by weight of the halide in the polymer and which has an average macromolecular weight of at least 15,000.

6. Composite material comprising wire and a thermally shrunk covering, said covering comprising textile fibers of a vinyl resin resulting from the conjoint polymerization of vinyl chloride with vinyl acetate, which contains from about 70% to about 95% by weight of vinyl chloride in the polymer and which has an average macromolecular weight of at least 15,000.

7. Composite articles comprising wire and a covering composed of glass fibers and stretched fibers of a vinyl resin substantially identical with a resin resulting from the conjoint polymerization of a vinyl halide with a vinyl ester of an aliphatic acid, containing between about 70% and about 95% by weight of vinyl halide in the polymer and which has an average macromolecular weight of at least 7500.

8. Composite articles comprising wire and a shrunk covering composed of glass fibers and fibers of a vinyl resin substantially identical with a resin resulting from the conjoint polymerization of a vinyl halide with a vinyl ester of an aliphatic acid, containing between about 70% and about 95% by weight of vinyl halide in the polymer and which has an average macromolecular weight of at least 15,000.

9. Composite articles comprising rubber filaments and a covering, said covering comprising filaments or fibers of a vinyl resin substantially identical with a resin resulting from the conjoint polymerization of a vinyl halide with a vinyl ester of an aliphatic acid, which contains from about 70% to about 95% by weight of the halide in the polymer and which has an average macromolecular weight of at least 7500.

10. Composite articles comprising rubber filaments and a shrunk covering, said covering comprising filaments or fibers of a vinyl resin resulting from the conjoint polymerization of vinyl chloride with vinyl acetate, which contains from about 70% to about 95% by weight of vinyl chloride in the polymer and which has an average macromolecular weight of at least 15,000.

11. Composite articles comprising wire and a covering, said covering comprising fibers of esbestos and fibers of a vinyl resin substantially identical with a resin resulting from the conjoint polymerization of a vinyl halide with a vinyl ester of an aliphatic acid, which contains from about 70% to about 95% by weight of the halide in the polymer and which has an average macromolecular weight of at least 7500.

12. Process of forming a covering upon an article of the class of strands, cables, ropes, lines, wire, cords, and the like, which comprises forming around said article a filamentary sheath comprising stretched fibers of a vinyl resin substantially identical with those which may result from the conjoint polymerization of a vinyl halide with a vinyl ester of an aliphatic acid, containing between about 70% and about 95% by weight of vniyl halide in the polymer and having an average macromolecular weight of at least 7500, and shrinking said covering around the article to reduce the porosity of the covering and make it conform closely to the shape of the article.

EDWARD W. RUGELEY.
THEOPHILUS A. FEILD, JR.
JOHN F. CONLON.